(12) United States Patent
Towns et al.

(10) Patent No.: US 7,091,985 B1
(45) Date of Patent: Aug. 15, 2006

(54) SYSTEM AND METHOD FOR COMPRESSING COLOR DATA USING EXPANDABLE COLOR PALETTE

(75) Inventors: Timothy Leroy Towns, Longmont, CO (US); John T. Varga, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 989 days.

(21) Appl. No.: 09/571,790

(22) Filed: May 16, 2000

(51) Int. Cl.
*G09G 5/02* (2006.01)

(52) U.S. Cl. ............ 345/589; 345/600; 345/601; 345/602

(58) Field of Classification Search ......... 345/600–602
See application file for complete search history.

(56) References Cited

U.S. PATENT DOCUMENTS

| | | | |
|---|---|---|---|
| 5,111,292 A | 5/1992 | Kuriacose et al. | |
| 5,151,783 A | 9/1992 | Faroudja | |
| 5,157,764 A | 10/1992 | Priem et al. | |
| 5,220,646 A | 6/1993 | Fossum | |
| 5,230,649 A | 7/1993 | Robertson | |
| 5,231,484 A | 7/1993 | Gonzales et al. | |
| 5,325,125 A | 6/1994 | Naimpally et al. | |
| 5,377,499 A | 1/1995 | Zugibe | |
| 5,483,358 A | 1/1996 | Sugiura et al. | |
| 5,537,579 A * | 7/1996 | Hiroyuki | 345/601 |
| 5,608,426 A * | 3/1997 | Hester | 345/600 |
| 5,627,950 A * | 5/1997 | Stokes | 345/591 |
| 5,636,335 A * | 6/1997 | Robertson et al. | 345/602 |
| 5,664,080 A | 9/1997 | Lucas et al. | |
| 5,684,896 A | 11/1997 | Stone et al. | |
| 5,718,493 A | 2/1998 | Nikolai | |
| 5,760,248 A | 6/1998 | Sisto et al. | |
| 5,886,701 A | 3/1999 | Chauvin et al. | |
| 5,896,122 A * | 4/1999 | MacDonald et al. | 345/602 |
| 5,906,630 A | 5/1999 | Anderhub et al. | |

(Continued)

FOREIGN PATENT DOCUMENTS

| | | |
|---|---|---|
| EP | 0 969 656 A1 | 1/2000 |

(Continued)

OTHER PUBLICATIONS

IBM Technical Disclosure Bulletin, "High Quality High Compression 8-Bit Digital Video," vol. 36, No. 06B, Jun. 1993, pp. 401-404.

(Continued)

*Primary Examiner*—Kee M. Tung
*Assistant Examiner*—Chante Harrison
(74) *Attorney, Agent, or Firm*—Chambliss, Bahner & Stophel; David W. Lynch

(57) ABSTRACT

A method, apparatus, and information bearing medium for compressing color utilizes an expandable color palette for storing a pre-established number of n-bit color codes. Each of the n-bit color codes maps to an m-bit color value, where m is an integer greater than n. Up to the pre-established number of n-bit color codes are stored in a first palette table of the color palette. The color palette is expanded to include up to a specified number of palette tables for storing sets of the pre-established number of n-bit color codes. The pre-established number of n-bit color codes is characterized by $2^n-1$ color codes. The color palette is expanded to include up to $(m/n)-1$ palette tables for storing sets of $2^n-1$ color codes. Each of the palette tables is associated with a pixel table which stores a linking value for associating a particular palette table to a subsequently generated palette table.

38 Claims, 8 Drawing Sheets

U.S. PATENT DOCUMENTS

| | | | |
|---|---|---|---|
| 5,949,409 A * | 9/1999 | Tanaka et al. | 345/549 |
| 5,977,823 A | 11/1999 | Inoue et al. | |
| 5,977,960 A | 11/1999 | Nally et al. | |
| 5,977,977 A | 11/1999 | Kajiya et al. | |
| 5,978,029 A | 11/1999 | Boice et al. | |
| 5,999,189 A | 12/1999 | Kajiya et al. | |
| 6,008,816 A * | 12/1999 | Eisler | 345/549 |
| 6,025,417 A | 2/2000 | Willett et al. | |
| 6,025,927 A | 2/2000 | Honma | |
| 6,069,611 A * | 5/2000 | Flynn et al. | 345/589 |
| 6,388,675 B1 * | 5/2002 | Kamada et al. | 345/600 |

FOREIGN PATENT DOCUMENTS

| | | |
|---|---|---|
| JP | 10-294877 | 11/1998 |
| JP | 11-122495 | 4/1999 |
| JP | 11-219039 | 8/1999 |
| JP | 11-234697 | 8/1999 |
| JP | 11-308465 | 11/1999 |

OTHER PUBLICATIONS

Yun-Chin Li et al., "A Scene Adaptive Hybrid Video Coding Scheme Based on the LOT," IEEE Transactions on Circuits and Systems for Video Technology, vol. 8, No. 1, Feb. 1998, pp. 92-103.

* cited by examiner

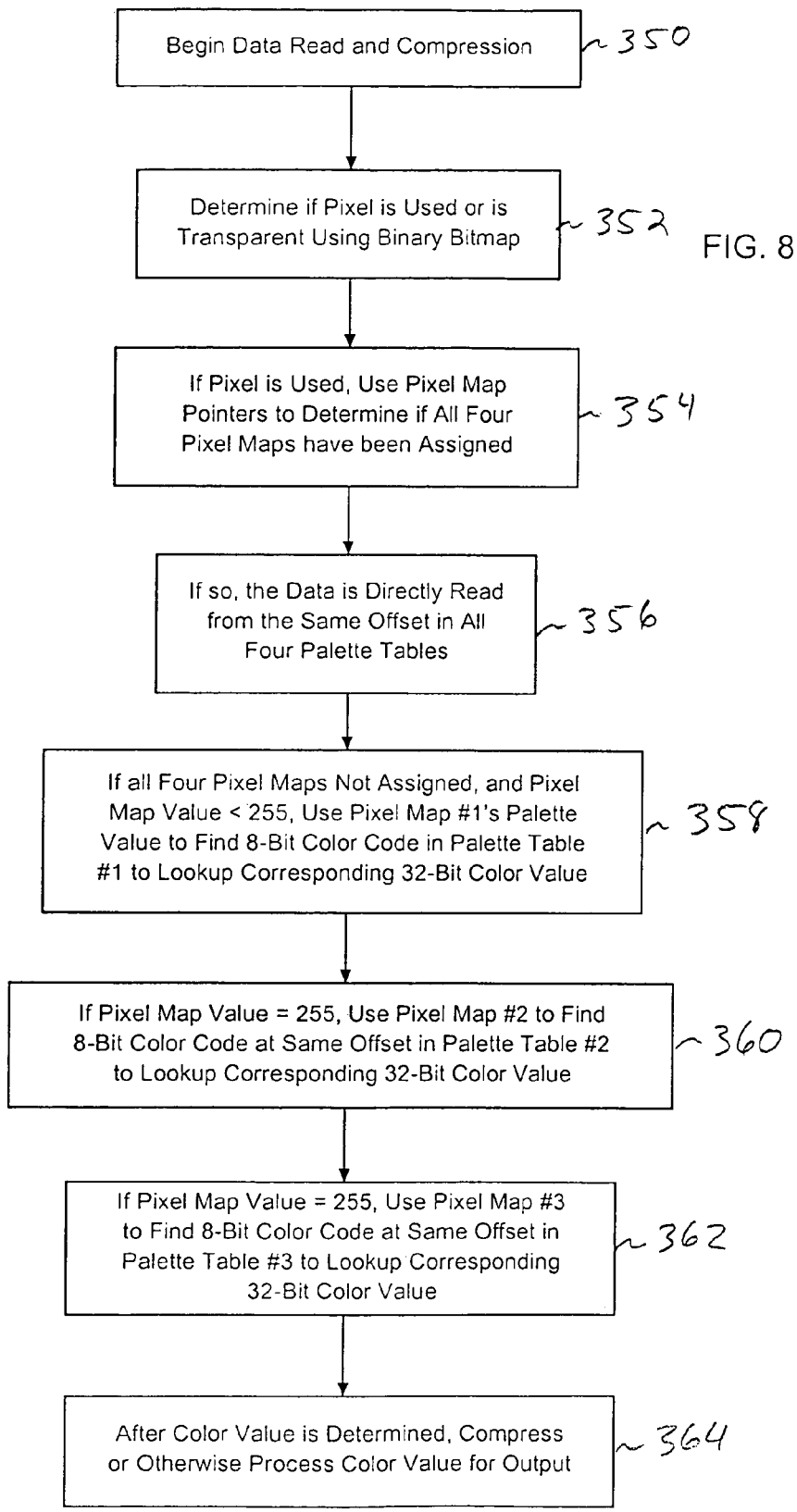

SYSTEM AND METHOD FOR COMPRESSING COLOR DATA USING EXPANDABLE COLOR PALETTE

CROSS-REFERENCE TO RELATED APPLICATIONS

This application is related to the following co-pending and commonly-assigned patent applications, all of which are hereby incorporated herein by reference in their respective entireties:

"Color Image Data and Control Bit Compression Scheme with Run Length Encoding," to Jean M. Aschenbrenner, Stephen D. Hanna, and John T. Varga, Ser. No. 09/511,132;

"Method, System, Program, and Data Structure for Generating Raster Objects," to Jean M. Aschenbrenner, Christopher Kush, and John T. Varga, Ser. No. 09/569,777;

"Method, System, and Logic for Selecting Line Work and Control Data for a Pixel from Multiple Objects of Line Work Data Provided for the Pixel" to David E. Finlay and Phillip K. Hoskins, Ser. No. 09/570,211;

"System and Method for Merging Line Work Objects Using Tokenization and Selective Compression," to John T. Varga, Ser. No. 09/570,211; and "System and Method for Optimizing Color Compression Using Transparency Control Bits," to John Varga, Ser. No. 09/571,519.

FIELD OF THE INVENTION

The present invention relates generally to data compression schemes and, more particularly, to compressing color data using an expandable color palette.

BACKGROUND OF THE INVENTION

To print an image, a print engine processor, referred to herein as a raster image processor, converts the image in a page description language or vector graphics format to a bit mapped image indicating a value to print at each pixel of the image. The bit mapped image is sent to the printer to cause the print heads to print the specified color value at the pixel according to the information in the bit map. If a printer has multiple print heads, such as a print head for different colors, then bitmaps are generated for each print head. The print heads overlay the images defined by their respective bitmaps onto the print medium.

To produce the bitmaps for the print heads, the raster image processor performs numerous transformations on a print image, which may include different types of data, such as line art, e.g., text and graphics, and continuous tone (contone), e.g., images. The raster image processor usually performs operations such as data compression, color space conversion, and halftoning when generating the raster bit map to print. After dissecting a print image into different components, such as color components, text art, contone, images, etc., the raster image processor must then merge the different elements together so that the original image, previously split into different components, is reconstructed for the color plane process.

As newer printers print at ever higher resolutions and speeds, the amount of data needed to generate the print job correspondingly increases. One of the major limitations in increasing printer speed is the time required to rasterize print data, especially the time required by the raster image processor to break an image into different object components and then reassemble, screen and merge those components into a final bitmap image.

Printer systems have a series of hardware and software operations through which digital data passes in preparation for printing, referred to as a pipeline. The digital data is used by a print engine to form a print image on a print surface using, for examples, a scanning laser beam or an inkjet. An area of the print surface on which the image is formed is referred to as a picture element (pel or pixel). One scan of the laser beam across the print surface forms a row of pixels, referred to as a scan row. As such, the print image is formed with multiple scan rows.

The type of data that passes through the pipeline may include both text, graphics, and image. As printers increase the density of dot placements, particularly with color printing that requires additional bits per pixel over monochrome printing, the time required for the printer's data pipeline to transmit the data becomes substantial. To fully utilize the increasing print speed capabilities of print engines, the pipeline of a printer system must be able to transfer data sufficiently fast to supply a continuous stream of data to the print engine, thereby allowing the print engine to print continuously.

Printer systems typically use data compression and decompression techniques to reduce data size, such that data may be transmitted faster through a printer's pipeline. Data compression refers to a process that attempts to convert data in a given format into an alternative format requiring less space than the original. As such, data compression systems effect a savings in the amount of storage required to hold, or the amount of time required to transmit, a given body of digital information.

In accordance with a known compression method, referred to as run length encoding, the length of continuous identical pixel data is converted into a run length code for transmission. For example, using one run length compression method, the pixel data line "aaaabbbbbbbccccccdd" is converted into the coded data "a4b7c5d2." The coded data consists of bytes of pixel information (a, b, c, and d) and the number of those bytes that are the same (4, 7, 5, and 2). Each byte in this illustrative example contains 8 bits of pixel information.

Such a byte-based compression method may still not provide enough reduction in storage space or transmit time that may be required by current print engines. These and other known compression methods may not be targeted to handle multiple bits/pixel. Furthermore, prior compression methods may not be efficient in terms of compressing color data.

Thus, there is a need in the art to provide an improved method, system, and program to transform print data, such as text, vector graphics, images and raster data, into a final rasterized bitmaps in a more timely manner to increase printer throughput. The present invention fulfills these and other needs.

SUMMARY OF THE INVENTION

The present invention is directed to a system, method, and processor-readable medium for compressing color data. An expandable color palette is used for storing a pre-established number of n-bit color codes. Each of the n-bit color codes maps to an m-bit color value, where m is an integer greater than n. Up to the pre-established number of n-bit color codes are stored in a first palette table of the color palette. The color palette is expanded to include up to a specified number of additional palette tables for storing additional sets of the pre-established number of n-bit color codes. A link is established for associating the first palette table to one or more additional palette tables.

In accordance with one embodiment of the present invention, the pre-established number of n-bit color codes is characterized by $2^n-1$ color codes. The color palette may be expanded to include up to $(m/n)-1$ palette tables for storing sets of $2^n-1$ color codes. For example, in the case of n=8 bits and m=32 bits, each palette table stores up to 255 8-bit color codes and the color palette is expandable to up to 3 palette tables.

Storing the color codes may further involve providing up to $(m/n)$ pixel maps, such that up to $(m/n)-1$ pixel maps are used to facilitate storing of the n-bit color codes in an associated palette table. Each of $(m/n)-1$ pixel maps is associated with one of the additional palette tables. For example, a first pixel map of the graphic drawing space may be generated. The first pixel map stores palette values, each of which represents an n-bit color code and a palette table identifier. The palette table identifier associates the first pixel map with the first palette table.

A usage bitmap representative of the graphic drawing space may also be generated. The usage bitmap stores pixel values representative of a transparency state of a corresponding pixel in the graphic drawing space. A non-transparent state for pixel values in the usage bitmap indicates usage of an associated color code in one of the palette tables. A value indicative of a non-transparent state is written to pixel values in the usage bitmap having an associated color code in one of the palette tables.

For example, after storing the pre-established number of n-bit color codes in each of $(m/n)-1$ palette tables, an $(m/n^{th})$ pixel map is generated. A lookup operation is performed to locate a particular m-bit color value associated with non-transparent pixel locations in the usage bitmap. A writing operation is performed which involves replacing palette values at the associated non-transparent pixel locations in the $(m/n)$ pixel maps with m-bit color data, such that the m-bit color value is divided into $(m/n)$ segments and each of the segments is respectively stored in the $(m/n)$ pixel maps at the associated non-transparent pixel locations.

Color codes are read from the color palette. Reading color codes from the color palette may involve searching a first palette table for a particular m-bit color value and, if not located in the first palette table, searching additional palette tables for the particular m-bit color value. The n-bit color code is read from the first or additional palette tables in which the m-bit color value is located.

In accordance with another embodiment of the present invention, an expandable color palette is provided for storing n-bit color codes, such that each of the n-bit color codes maps to an m-bit color value, and m is an integer greater than n. A pixel map of a graphic drawing space is generated. The pixel map stores palette values each representing an n-bit color code and a palette table identifier. In response to an m-bit color value input, the color palette is searched for a particular n-bit color code associated with the input m-bit color value. The particular n-bit color code is written in the pixel map at each pixel map location in which the m-bit color value appears.

If the particular m-bit color value does not appear in a palette table of the color palette, the m-bit color value is inserted in an available location in the palette table. The particular n-bit color code is written in the pixel map at each pixel map location in which the m-bit color value appears. If no location is available in the palette table, an additional pixel map and an additional palette table are generated. The m-bit color value is inserted in the additional palette table. The particular n-bit color code is written in the additional pixel map at each additional pixel map location in which the m-bit color value appears. A link is established for associating the palette table to the additional palette table. For example, the pixel maps may store a pre-established number of palette values including a reserved palette value. The reserved palette value is used to store a linking value that associates the pixel map with the additional pixel map.

Reading color codes from the color palette may be accomplished in a manner described above. A usage bitmap representative of the graphic drawing space may also be utilized in this embodiment, such as in a manner discussed above.

According to another embodiment of the present invention, a system for compressing color data includes memory configured to support an expandable color palette for storing a pre-established number of n-bit color codes, wherein each of the n-bit color codes maps to an m-bit color value and m is an integer greater than n. The system further includes a processor, coupled to the memory. The processor stores up to the pre-established number of n-bit color codes in a first palette table of the color palette and expands the color palette to include up to a specified number of additional palette tables for storing additional sets of the pre-established number of n-bit color codes. The processor further stores a link value for associating the first palette table to one or more additional palette tables. The processor cooperates with the memory to compress color data in accordance with the methodologies described above.

Another embodiment of the present invention is directed to an information bearing medium comprising processor-readable instructions for compressing color data. The processor-readable instructions cause a processor to perform the steps of providing an expandable color palette for storing a pre-established number of n-bit color codes and storing up to the pre-established number of n-bit color codes in a first palette table of the color palette. The processor readable instructions further cause the processor to expand the color palette to include up to a specified number of additional palette tables for storing additional sets of the pre-established number of n-bit color codes, and establish a link for associating the first palette table to one or more additional palette tables. Other steps, such as those discussed above, may be implemented by the processor in response to the processor-readable instructions.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

BRIEF DESCRIPTION OF THE DRAWINGS

FIG. 8 illustrates various process steps associated with reading encoded color data from one or more pixel maps depicted in FIG. 3 for purposes of further compressing the encoded color data or using the encoded color data for other purposes, in accordance with an embodiment of the present invention.

Figure 1:
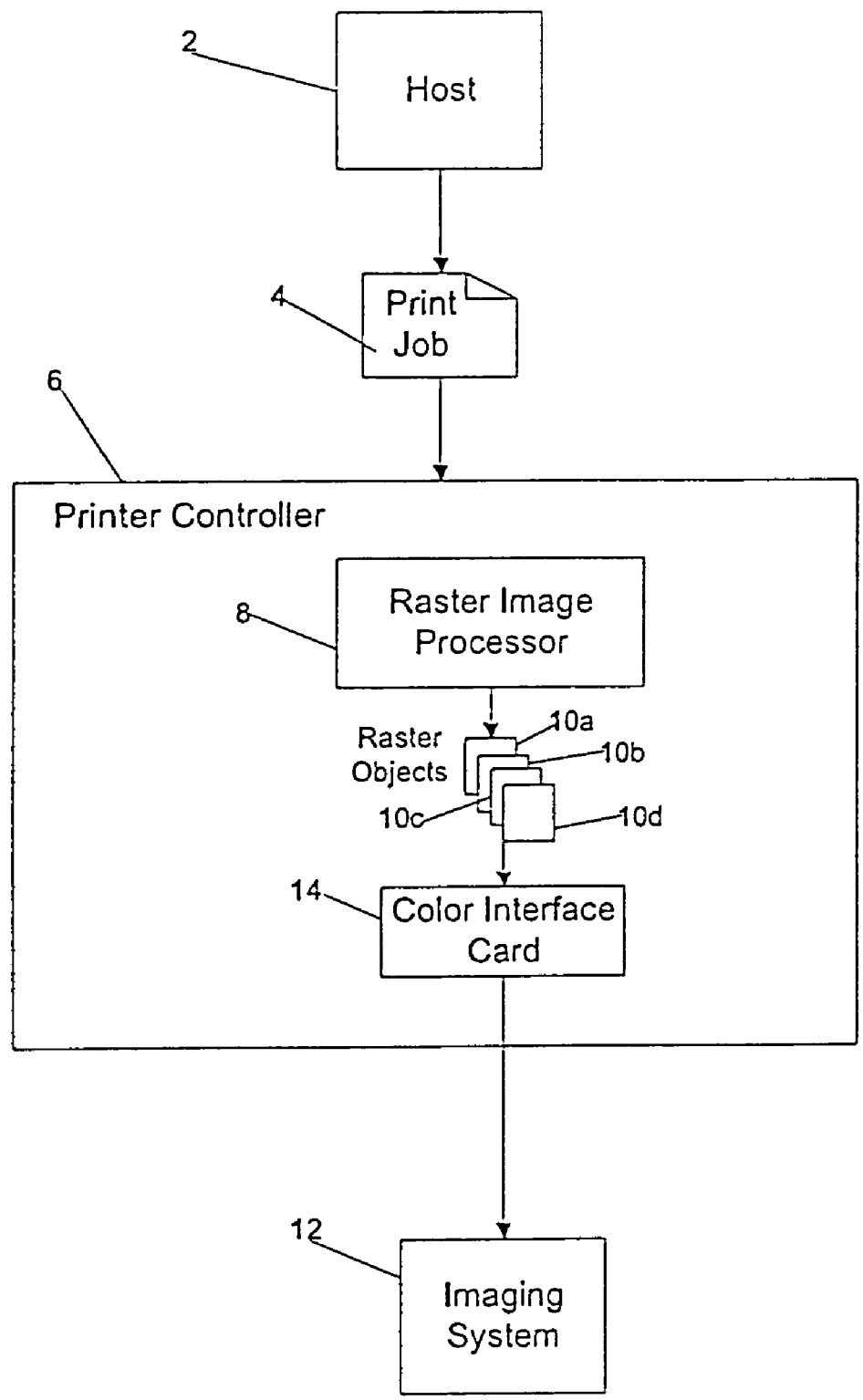
FIG. 1 shows a printing environment in which illustrative embodiments of the present invention are implemented.

While the invention is amenable to various modifications and alternative forms, specifics thereof have been shown by way of example in the drawings and will be described in detail hereinbelow. It is to be understood, however, that the intention is not to limit the invention to the particular embodiments described. On the contrary, the invention is intended to cover all modifications, equivalents, and alternatives falling within the scope of the invention as defined by the appended claims.

DETAILED DESCRIPTION OF VARIOUS EMBODIMENTS

In the following description of the illustrated embodiments, references are made to the accompanying drawings which form a part hereof, and in which is shown by way of illustration, various embodiments in which the invention may be practiced. It is to be understood that other embodiments may be utilized, and structural and functional changes may be made without departing from the scope of the present invention.

A system and methodology in accordance with the principles of the present invention provide for increased compression of color data over prior art approaches. A color compression approach consistent with the principles of the present invention employs a set of color palettes to encode a line work object. Each of the color palettes includes a set of discrete colors. As the number of colors increases, the storage usage of the representation maintains the compression without expanding the width of the data that is being manipulated. In the context of 32-bit color, the full set of 4,294,967,296 colors is representable without using more storage than that required to store 32 bits per pixel plus a 1-bit mask pixel.

A color compression approach which utilizes an expandable color palette in accordance with the principles of the present invention allows graphics objects to be built without having to know the number of colors that will ultimately be used, while using an efficient method of encoding the pixels compatible with previous graphic algorithms. A color compression approach of the present invention optimizes cases where less than 256 different colors are used, without resulting in a performance penalty. Moreover, because a 1-bit mask pixel is used, the pixels defining the color do not have to be initialized each time a new mapping is initiated.

A palette describes the data derived from a specialized type of bitmap. A palette is a bitmap-like image where each pixel within the palette is represented by n bits (e.g., n=8 in the embodiments described herein) as a shorthand to refer to a table of colors. The table index refers to an entry that contains a 32-bit CMYK color-corrected color specification. A palette is capable of handling $2^n-1$ colors for each palette table (e.g., 255 colors in the embodiments described herein). If this limit is exceeded, a link to a new palette table is established for an additional $2^n-1$ colors.

By way of example, for the $256^{th}$ color (i.e., n=8), X'FF' is inserted into a pixel map, and a new palette table and pixel map are generated. The new color is then assigned to position 0 in the new palette table, and X'00' is written into the same pixel map position, but in the new pixel map. Likewise, the $257^{th}$ color is placed at index 1 in the second palette table, with X'01' inserted into the second pixel map.

Each new palette table requires a new n-bit deep pixel map. These additional pixel maps need not be initialized because only the used positions, having X'FF' in the original palette table, need be examined. Once $(32/n)-1$ palette tables are exceeded (e.g., 32/8−1=3 in the embodiments described herein), the palette is converted internally into a 32-bit display item so that storage is not wasted beyond the amount actually required.

Turning now to the figures, and more particularly to FIG. 1, there is illustrated a printing environment within which systems and methods of the present invention may find particular applicability. In accordance with the illustrative embodiment shown in FIG. 1, a host computer 2 generates a print job 4 that may include image (contone) and line work (text) components. The host 2 transmits the print job 4 to a printer controller 6 over a cable or network transmission line. The printer controller 6 may comprise a standalone processor or computer, such as the IBM RS/6000 processor. The printer controller 6 includes a raster image processor 8, that is preferably implemented in the RS/6000 main processor and accompanying firmware.

In one embodiment, the raster image processor 8 generates raster objects 10a, b, c, d including the raster data. Each raster object 10a, b, c, d includes pixel information for one color component of the imaging system 12. For example, if the imaging system 12 prints Cyan (C), Magenta (M), Yellow (Y) and black (K), then one raster object would be associated with each color component for a scan line to print. Further, there may be separate raster objects 10a, b, c, d for line art and contone (images), thus providing eight separate raster objects for each color component of a scan line for the line art and contone components of the line. The printer controller 6 and imaging system 12 components may be implemented in the same large scale printer, such as the International Business Machines (IBM) Corporation's IINFOPRINT color printers, or with a separate server and standalone printer communicating over a network or attached directly using a serial or parallel port.

As is further shown in FIG. 1, a color interface card (CIC card) 14 is coupled to the raster image processor 8. The CIC card 14 is preferably implemented on a hardware card, such as a PCI card, using Field Programmable Gate Array (FPGA) logic. The CIC card 14 may be inserted in a PCI slot of the backplane of the printer controller 6. The CIC card 14 performs further processing of the raster objects 10 before the objects 10 are communicated to the imaging system 12 for printing.

In certain implementations, one CIC card 14 is capable of producing print data for two of four color planes. In such a case, two CIC cards are needed to generate the final raster for an output device which uses all four color planes. In duplex implementations, such as where a printer prints on both sides of a sheet concurrently, four CIC cards 14 would be used, two for each side of the sheet to concurrently generate raster data for the print heads printing to both sides of the sheet.

Related patent application entitled "Method, System, Program, And Data Structure for Generating Raster Objects", Ser. No. 09/569,777, and incorporated by reference above, describes the process for generating the contone and line work raster objects 10*a, b, c, d* used by the CIC card 14 to combine and produce the final print output. The raster image processor 8 encodes the line work and contone objects with header information that enables the CIC card 14 logic to combine multiple line work and contone objects per scan line into final print output. In this way, many of the raster processing operations can be off-loaded to a separate hardware card (e.g., the CIC card 14), thereby relieving the raster image processor 8 of many of the processor intensive raster operations. This, in turn, substantially increases the ultimate printer speed and performance because the final raster output data used by the printer (or other output device) is generated faster by offloading many of the raster processing operations to dedicated hardware logic implemented in the CIC card 14.

In accordance with an embodiment of the present invention, the CIC card 14 includes hardware logic to handle up to four line work and four contone objects per scan line per color, totaling 16 line work and 16 contone objects per scan line. For this reason, if the raster image processor 8 receives input print data objects including more than four contone or line work objects per scan line, then the raster image processor 8 must merge certain objects to conform to the CIC card 14 hardware limitations. If the CIC card 14 was capable of handling more or less line work or contone objects per scan line, i.e., n objects, then the raster image processor 8 would have to merge input print data objects to ensure that there are no more than n line work or n contone objects per scan line.

The raster image processor 8 will generate contone objects that provide eight bits per pel for contone (CT) color data and line work objects that provide eight bits per pel for the line work (LW) color data. The raster image processor 8 further generates two line work control (LWC) bits for each pixel in the line work object. The line work control (LWC) bits can be encoded with one of three values, namely, select line work (LW), select contone (CT) or transparent values. The select line work (LW) value instructs the CIC card 14 to use the pixel data in the line work object over data for the pixel in any other line work object or contone object. The select contone (CT) value instructs the CIC card 14 to use the pixel data in the highest priority contone (CT) object over data for the pixel in any line work (LW) object.

Another line work control bit value, which represents the transparent value, instructs the CIC card 14 to consider the line work control (LWC) bits in the next highest priority line work control object. In other words, the transparent value instructs the CIC card 14 to consider the instant pixel to be transparent, and the next lower order line work data should be considered to determine whether it is non-transparent and used. The transparent LWC bit setting effectively provides a control mask which indicates whether color data for a particular pixel should be displayed (is non-transparent) or not displayed (is transparent).

Figure 2:
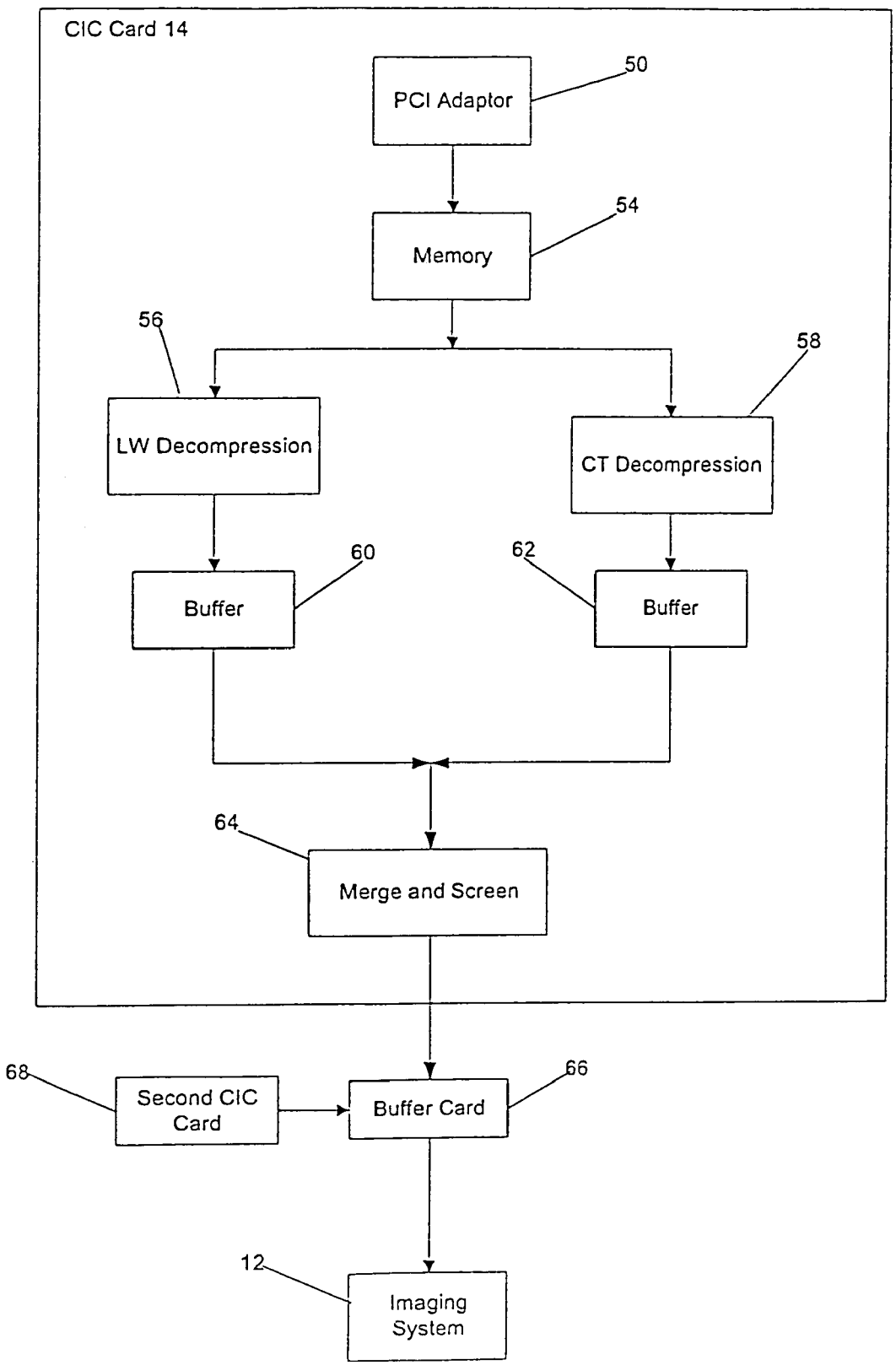
FIG. 2 illustrates hardware architecture implemented in a card that processes compressed color data according to an embodiment of the present invention.

Referring now to FIG. 2, there is shown in greater detail various elements of a CIC card 14 which cooperates with the raster image processor 8 of the printer controller shown in FIG. 1. The CIC card 14 hardware retrieves the generated raster objects 10*a, b, c, d*, i.e., line work and contone objects, from the raster image processor 8 memory to generate final raster output for the imaging system 12. FIG. 2 illustrates an architectural embodiment of the CIC card 14 shown in FIG. 1.

The CIC card 14 depicted in FIG. 2 includes a peripheral component interconnect (PCI) adaptor 50, which includes logic to retrieve line work and contone objects from the raster image processor 8. Memory 54 buffers and stores the retrieved line work and contone objects and their headers. The memory 54 may comprise one or more memory cards for storing the header data, line work (LW) objects, contone (CT) objects, and line work control (LWC) objects. The line work (LW) decompression logic 56 decompresses line work and line work control (LWC) objects, and the contone (CT) decompression logic 58 decompresses contone objects. The decompression logic 56 and 58 writes the decompressed data into buffers 60 and 62, respectively.

The merge and screen logic 64 accesses a byte of contone data from the contone (CT) buffer 62 and a byte of line work data from the line work buffer 60. Based on the value of the line work control (LWC) bits, i.e., line work select or contone select, the merge component of the logic 64 would merge the data into a single byte of data, from either the line work or contone data, and pass the merged data to the screening algorithm. Depending on the type of data, i.e., contone or line work, the screening logic would screen the data to provide the proper color intensity, and then write the data to the buffer card 66, which also receives pel data for two other color planes from a second CIC card 68. As discussed, in certain implementations, each CIC card 14 handles two color planes, thus requiring two cards for all four CMYK color planes.

Figure 3:
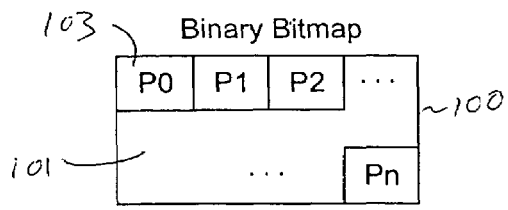
FIG. 3 is an illustration of various data structures that are employed to provide enhanced color compression in accordance with an embodiment of the present invention.
Figure 3:
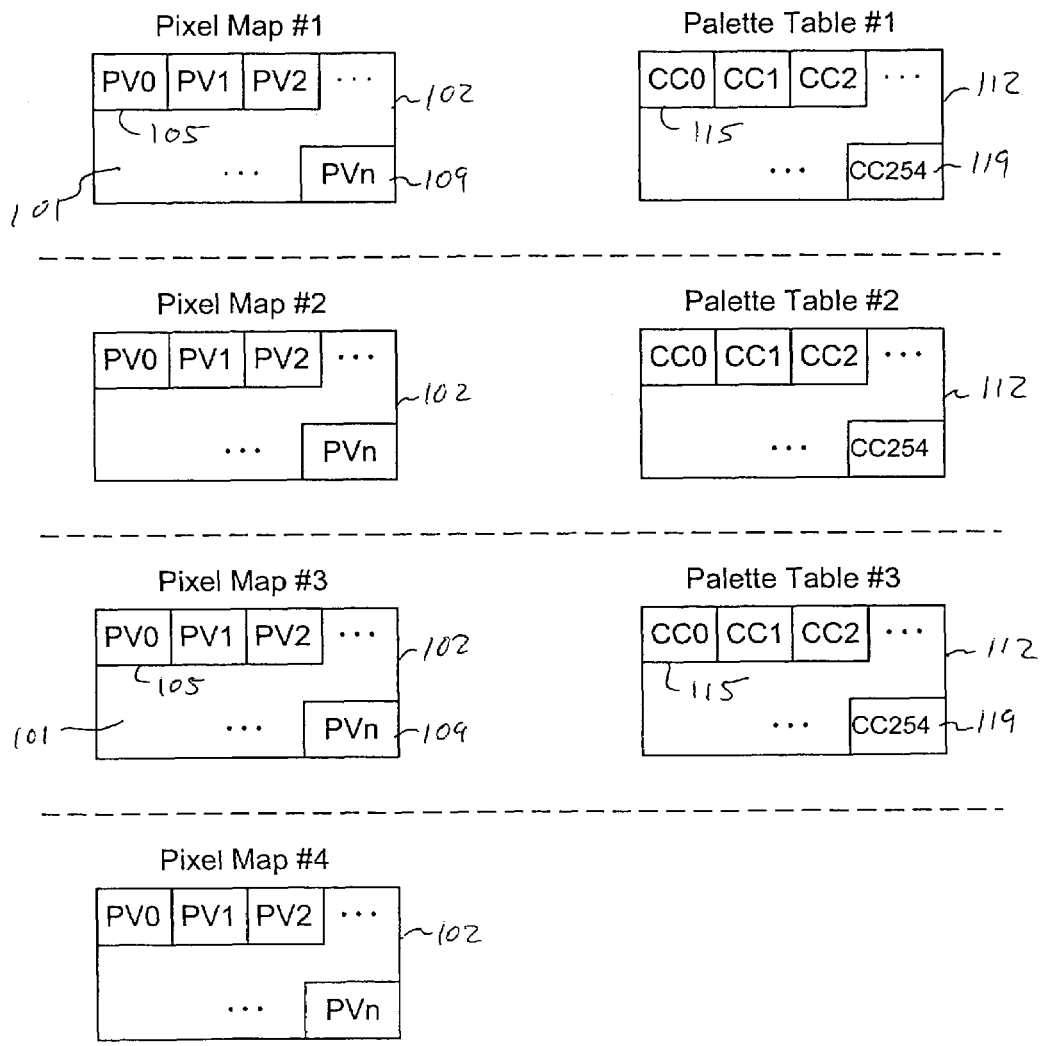
Figure 4:
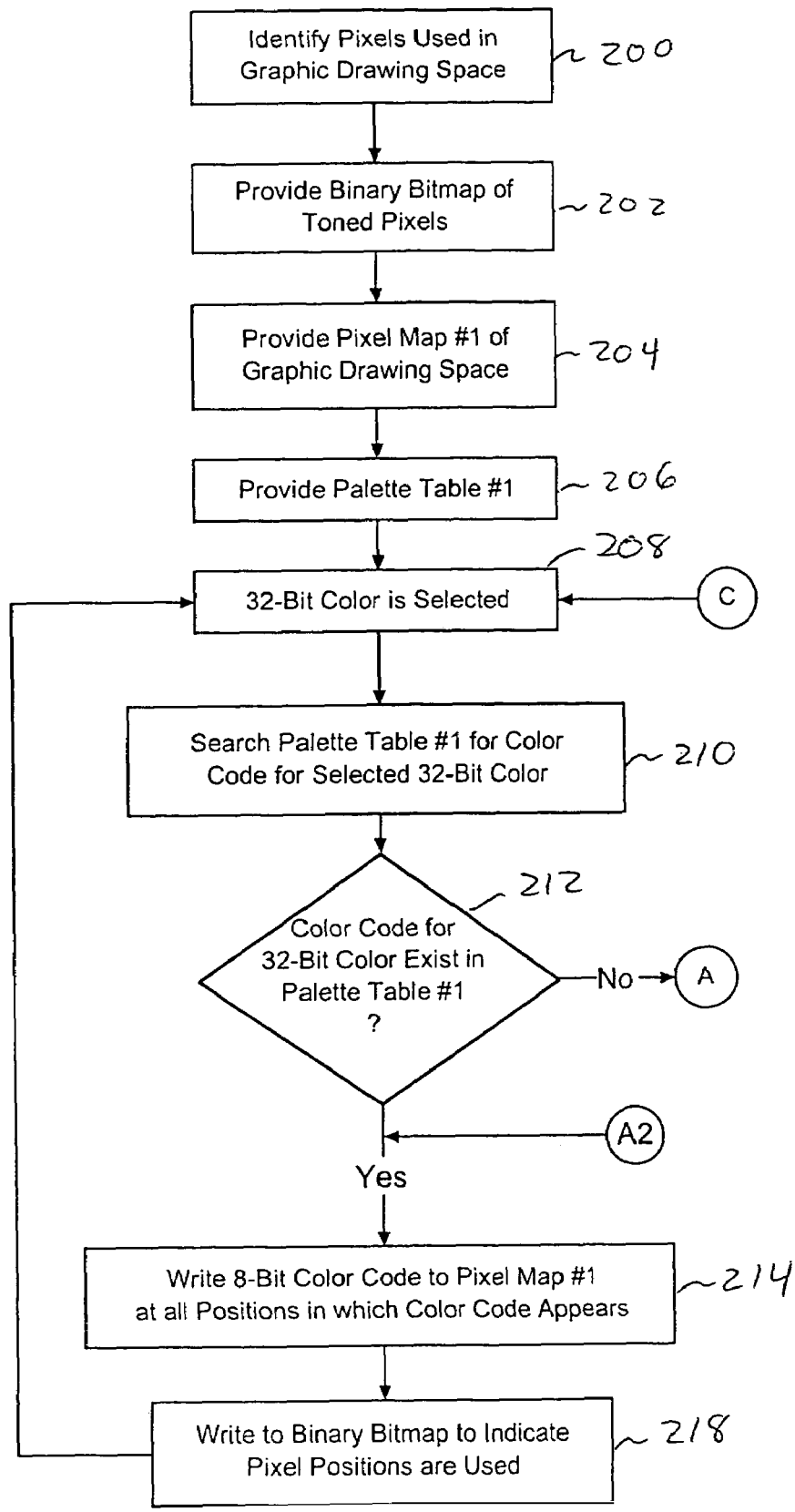
FIGS. 4–6 illustrate various process steps involving the data structures depicted in FIG. 3 for implementing a color compression technique according to an embodiment of the present invention.
Figure 5:
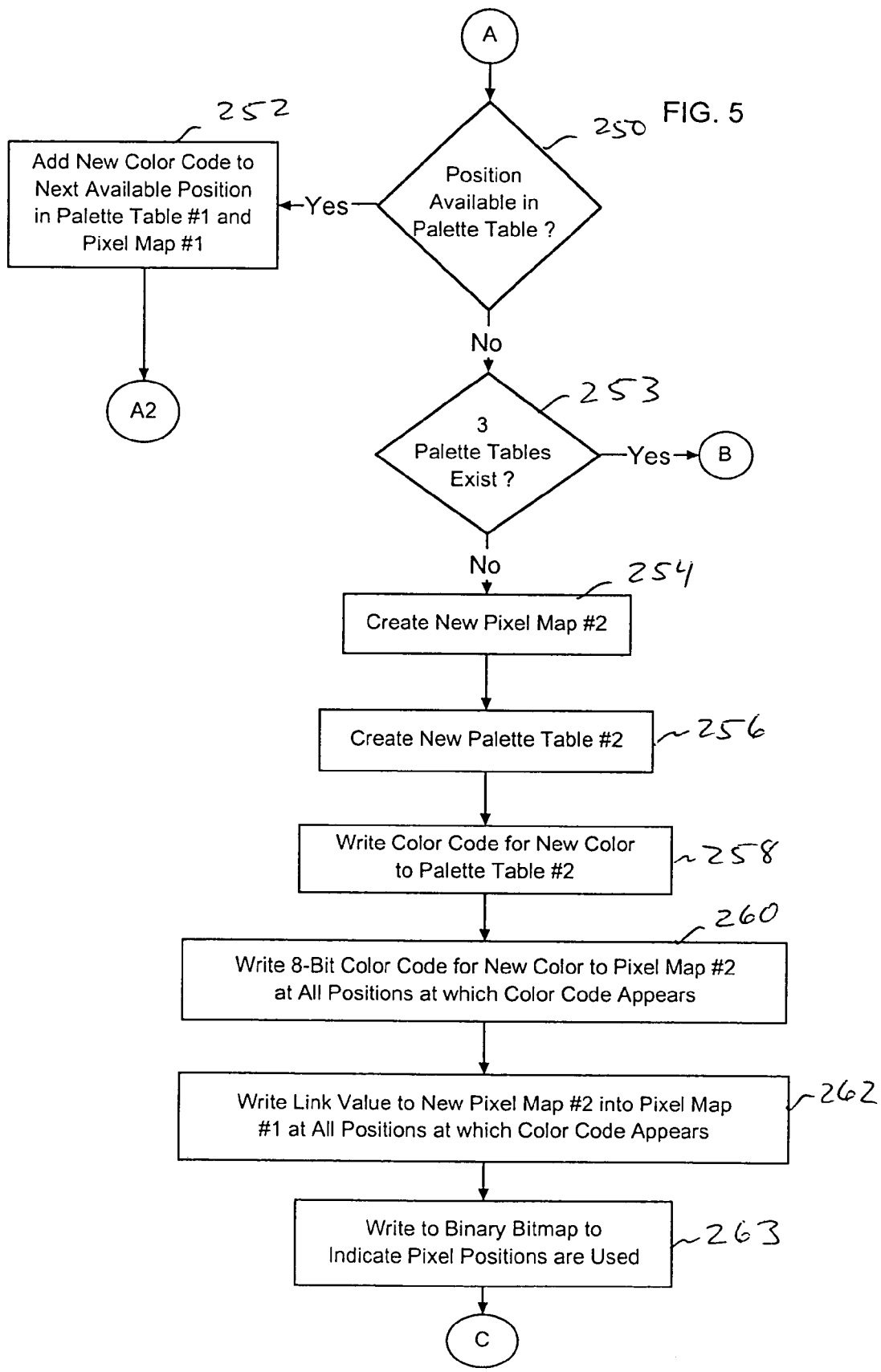
Figure 6:
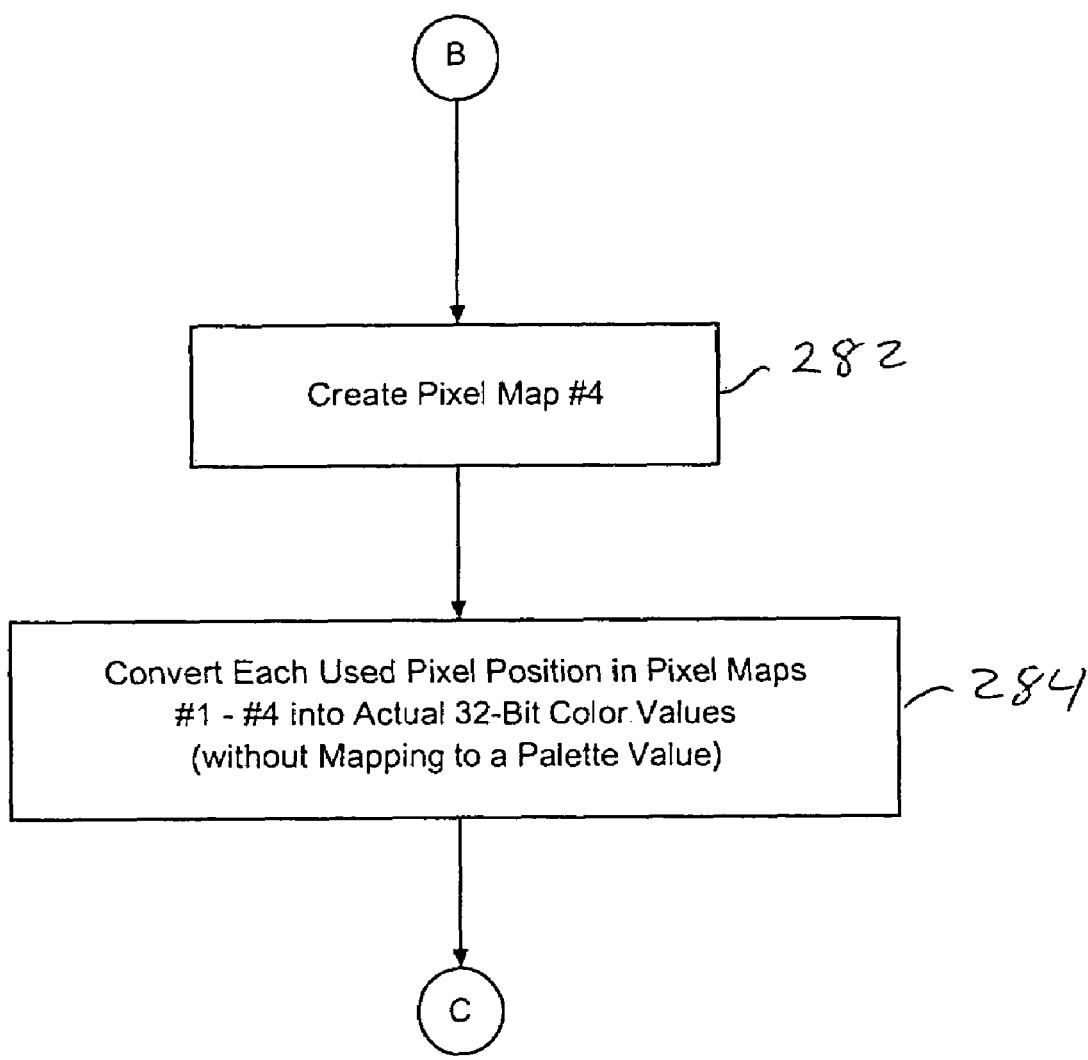

The present invention utilizes an extensible color palette which is defined to include a small set of colors. A compression methodology that employs an expandable color palette of the present invention advantageously provides for compressing of color values associated with full 32-bit colors into 8 bits. Referring now to FIG. 3, there is shown various data structures that are employed to provide enhanced color compression in accordance with an embodiment of the present invention. A binary bitmap 100 is defined to include a mapping of 1-bit toned pixels 103 (e.g., pixels P0, P1 . . . Pn) that represent pixel usage within a graphic drawing space 101. More particularly, the binary state of each pixel 103 within the binary bitmap 100 indicates whether the color data of a particular pixel 103 in the graphic drawing space 101 is to be used (i.e., will be printed).

The binary bitmap 100 is associated with one or more pixel maps 102 and one or more palette tables 112. A pixel map 102 is a mapping of the same graphic drawing space as binary bitmap 100, and is associated with a palette table 112. Pixel map 102 includes a specified number of palette values 105 (e.g., up to PVn). In accordance with this embodiment which is directed to a 32-bit color scheme, each palette value 105 in pixel map 102 is defined by an 8-bit encoded palette value (e.g., PV0, PV1 . . . PVn) plus a palette table identifier.

As will be discussed hereinbelow, the last palette value of a pixel map 102 (e.g., palette value PVn), represents a reserved palette value location which is used to establish a link between two pixel maps 102 (e.g., Pixel Map #1 and Pixel Map #2), which also provides linkage to another palette table (e.g., Palette Table #2). It is understood that the reserved palette value used for establishing linkage between pixel maps may be located at a location within the pixel map 102 other than the last palette value location.

A palette table 112 is associated with a pixel map 102, and includes a corresponding number of 8-bit color codes, which in this illustrative embodiment provides for 256 8-bit color codes. A palette table 112 maps up to 255 8-bit color codes to 32-bit color values.

The data structures described above (e.g., binary bitmap 100, pixel maps 102, and palette tables 112) are written to and read from using the methodology depicted in the flow diagrams of FIGS. 4–8 in accordance with one embodiment of a color compression technique of the present invention. With reference to FIGS. 1, 3 and 4–6, the pixels defining a given graphic drawing space 101 are identified 200 by the raster image processor 8.

A binary bitmap 100 of toned pixels 103 are provided 202 by the raster image processor 8. A first pixel map 102 (e.g., Pixel Map #1) of the same graphic drawing space 101 is provided 204 by the raster image processor 8. The raster image processor 8 further provides 206 a first palette table 112 (e.g., Palette Table #1). When a 32-bit color is chosen 208, a search of the first palette table 112 (i.e., Palette Table #1) is made 210 to locate the color code or encoding corresponding to the selected 32-bit color. If 212 the raster image processor 8 determines that the color code corresponding to the selected 32-bit color exists in Palette Table #1, then the raster image processor 8 writes 214 the 8-bit color code to Pixel Map #1 at all positions in which the color code appears. The raster image processor 8 also writes 218 to the binary bitmap 100 to indicate that the particular pixel(s) is/are used.

If 212 the raster image processor 8 determines that the color code corresponding to the selected 32-bit color does not exists in Palette Table #1, then the raster image processor 8 determines whether a position is available in Palette Table #1. If 250 an available position in Palette Table #1 is found, the new bit color code is added 252 to the next available position in Palette Table #1.

If 250 no position in Palette Table #1 is available (i.e., 255 color codes have been assigned in Palette Table #1), the color palette is extended to include a second palette table 112. In this case, the raster image processor 8 creates 254 a new pixel map 102 (e.g., Pixel Map #2) and a new palette table 112 (Palette Table #2). The raster image processor 8 then writes 258 the 8-bit color code for the new color to the first position (CC0) of Palette Table #2. The raster image processor 8 also writes 260 the 8-bit color code for the new color at all positions in which the color code appears in Pixel Map #2. A link value to new Pixel Map #2 is written 262 by the raster image processor 8 into Pixel Map #1 at all positions in which the color code appears. The raster image processor 8 writes 263 to the binary bitmap 100 to indicate that all the corresponding particular pixels are used.

The above-describe process of selecting a 32-bit color, searching existing palette tables 112 for 8-bit encoding representative of the selected 32-bit color, and creating new pixel maps 102 (e.g., Pixel Map #3) and palette tables 112 (e.g., Palette Table #3) continues until 255×3 colors have been assigned palette values. In this illustrative example, Pixel Maps #1–#3 and Palette Tables #1–#3 have been filled when 255×3 colors have been assigned palette values.

When three palette tables 112 have been generated 253 and three associated pixel maps 102 have been filled, a fourth pixel map 102 (e.g., Pixel Map #4) is created 282 by the raster image processor 8. Each used pixel position in the set of four pixel maps 102 is converted 284 into the actual 32-bit color values, without the need for mapping to a palette value (i.e., the first 8-bits are written into the first pixel map, the second 8-bits are written into the second pixel map, and so on).

Figure 7:
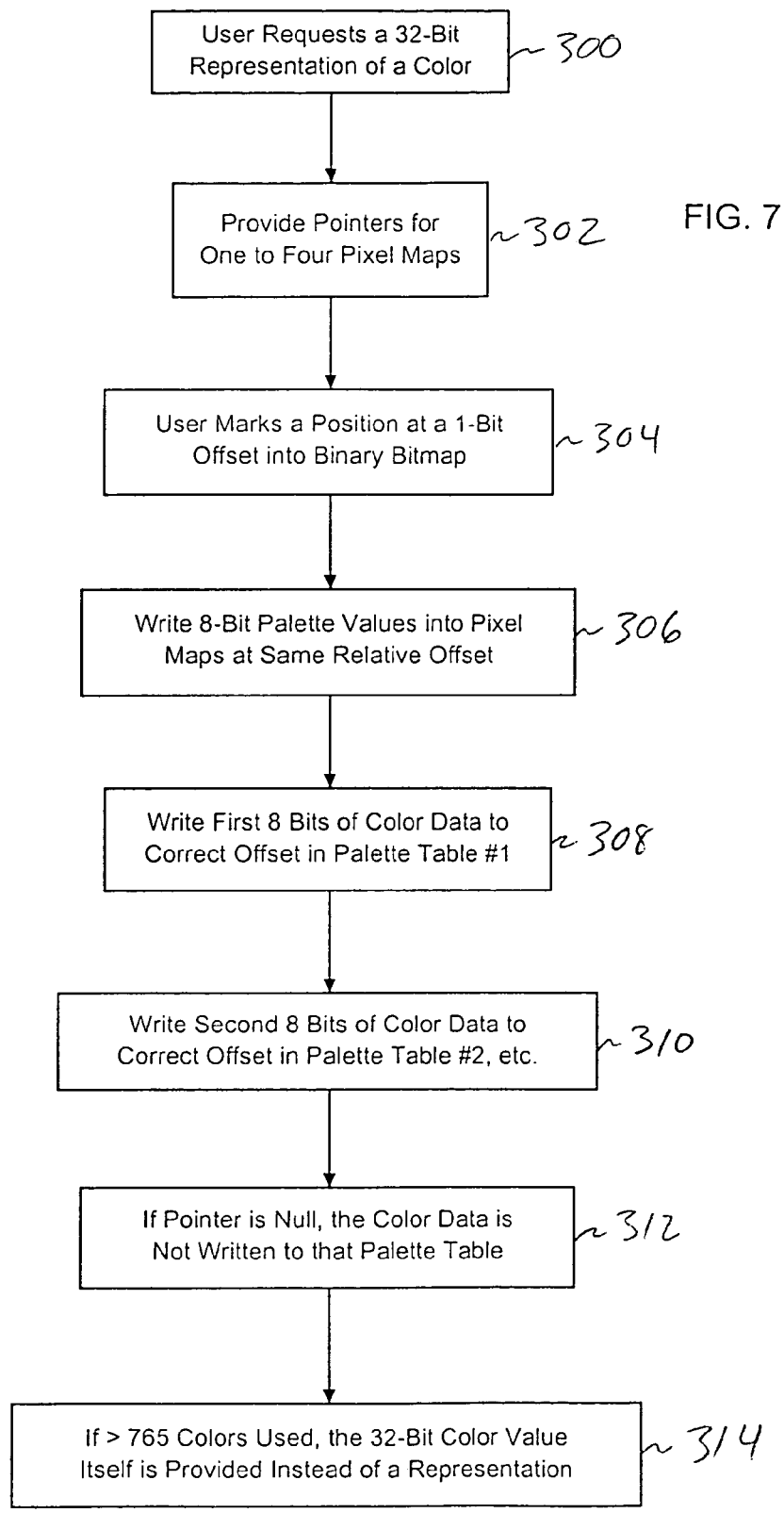
FIG. 7 illustrates various process steps associated with writing encoded color data into one or more pixel maps depicted in FIG. 3 in accordance with an embodiment of the present invention.

Referring now to FIG. 7, when writing data into the pixel maps 102, the user requests 300 a 32-bit representation of the color, and receives 302 pointers for one to four pixel maps 102. The user then marks 304 a position at a 1-bit offset into the binary bitmap 100 and 8-bit color codes are written 306 into the pixel maps 102 at the same relative offset. The first 8 bits of the color data are written 308 to the correct offset of the first palette table 112 (e.g., Palette Table #1), the second 8 bits are written 310 to the second palette table 112 (e.g., Palette Table #2), and so on. If the pointer is null, then the color data is not written 312 to that palette table 112.

Typically, pixel map pointers are assigned as the number of colors increases. By way of example, for three palette tables 112, a returned color code for a 32-bit input color might be 0xFFFF0500, which writes the 0xFF link into the first two palette tables 112 (e.g., Palette Tables #1 and #2) and the 0x05 value into the third palette table 112 (e.g., Palette Table #3). The fourth pointer is null, so the 0x00 component of the returned color code is ignored. If more than 765 colors are used, the 32-bit color value itself is returned 314 instead of a representation, and all four pixel map pointers are utilized. The user does not need to special-case this condition.

Turning now to FIG. 8, to read 350 the palette table data and compress it or use it in some other way, the 1-bit binary bitmap 100 is used indicated by binary bitmap 100, the pixel map pointers are used to determine if all four pixel maps (e.g., Pixel Maps #1–#4) have been assigned 354. If so, the color data is read 356 directly from the same offset in all four palette tables 112.

If all four pixel map pointers have not been used, the first pixel map's (e.g., Pixel Map #1) value (e.g., PVn) is used to find 358 the 8-bit color code corresponding to the 32-bit color value (e.g., CCn) in the first palette table (e.g., Palette Table #1) for pixel map values less than 255. If the pixel map value is 255, the second pixel map (e.g., Pixel Map #2) is used to find 360 the 32-bit color value at the same offset by performing a lookup in the second palette table (e.g., Palette Table #2). If the pixel map value to be looked up is 255, however, the third pixel map's (e.g., Pixel Map #3) value at the same offset is used to look up the 32-bit value in the third palette table (e.g., Palette Table #3). Once the 32-bit color value is determined, this value can be compressed for output or otherwise processed. When a new object is started, only the 1-bit bitmap is initialized to an unused value.

The compression technique disclosed herein optimizes color compression using an extensible color palette of a small set of color palette tables. When reading the color data for purposes of compressing the data, the binary bitmap 100 is used to indicate which pixels are used within the graphic drawing space. The color compression technique disclosed herein may also be employed in combination with other compression techniques. One such technique is disclosed in commonly owned U.S. application to John Varga, Ser. No. 09/571,519, entitled "System and Method for Optimizing Color Compression Using Transparency Control Bits," which is hereby incorporated by reference in its entirety.

According to the color compression technique disclosed in above-identified related application, and referring once again to FIG. 1, the line work control (LWC) bits of the CIC card 14 may be manipulated by the raster image processor 8 to implement a color compression methodology by which a segment of a display area is declared transparent. Normally, this LWC bit setting allows background pixels of an overlaying object (e.g., a font character) to allow an underlying object (e.g., another font character) to show behind the top object. The line work control (LWC) bits must be set to indicate which pixels are not part of the stroked lines that make up the character. The line work control (LWC) bits for the pixels which are not part of the stroked lines that make up the character are set to a transparent setting.

After the line work control (LWC) bits have been set to define the line work in the pixel data, the color data of each of the pixels within the entire bitmap area may be set to a desired color. The desired color is typically one that optimizes color data compression. This technique of setting particular unused pixels to a transparent setting may be employed to identify the pixels of pixel maps 102 which are used and unused.

Embodiments of the present invention may be implemented as a method, apparatus or information bearing media using standard programming and/or engineering techniques to produce software, firmware, hardware, or any combination thereof. The programs defining the functions of the various embodiments can be delivered to a computer via a variety of information bearing media, which include, but are not limited to, computer-readable devices, carriers, or media, such as a magnetic storage media, "floppy disk," CD-ROM, a file server providing access to the programs via a network transmission line, wireless transmission media, signals propagating through space, radio waves, infrared signals, etc. Of course, those skilled in the art will recognize that many modifications may be made to this configuration without departing from the scope of the present invention. Such information bearing media, when carrying computer-readable instructions that direct the functions of the present invention, represent further embodiments of the present invention.

The foregoing description of the various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of compressing color data, comprising:
providing an expandable color palette for storing a pre-established number of n-bit color codes, each of the n-bit color codes mapping to an m-bit color value, wherein m is an integer greater than n;
storing up to the pre-established number of n-bit color codes in a first palette table of the color palette;
expanding the color palette to include up to a specified number of additional palette tables for storing additional sets of the pre-established number of n-bit color codes; and
providing a link for associating the first palette table to one or more additional palette tables.

2. The method of claim 1, wherein the pre-established number of n-bit color codes is characterized by $2^n-1$ color codes.

3. The method of claim 1, wherein expanding the color palette comprises expanding the color palette to include up to (m/n)−1 palette tables for storing sets of $2^n-1$ color codes.

4. The method of claim 1, wherein storing the color codes further comprises providing up to (m/n) pixel maps, the method further comprising using up to (m/n)−1 pixel maps to facilitate storing of the n-bit color codes in an associated palette table.

5. The method of claim 1, wherein n=8 bits, m=32 bits, such that each palette table stores up to 255 8-bit color codes, and the color palette is expandable to up to 3 palette tables.

6. The method of claim 1, further comprising:
providing a usage bitmap representative of the graphic drawing space, the usage bitmap comprising pixel values representative of a transparency state of a corresponding pixel in the graphic drawing space; and
writing a value indicative of a non-transparent state to pixel values in the usage bitmap having an associated color code in one of the palette tables.

7. The method of claim 1, further comprising:
providing a first pixel map of the graphic drawing space, the first pixel map comprising palette values each representing an n-bit color code and a palette table identifier, the palette table identifier associating the first pixel map with the first palette table; and
generating up to a total of (m/n) pixel maps, each of (m/n)−1 pixel maps being associated with one of the additional palette tables.

8. The method of claim 7, further comprising:
providing a usage bitmap representative of the graphic drawing space, the usage bitmap comprising pixel values representative of a transparency state of a corresponding pixel in the graphic drawing space, a non-transparent state for pixel values in the usage bitmap indicating usage of an associated color code in one of the palette tables;
after storing the pre-established number of n-bit color codes in each of (m/n)−1 palette tables, generating an $(m/n^{th})$ pixel map;
looking up a particular m-bit color value associated with non-transparent pixel locations in the usage bitmap; and
replacing palette values at the associated non-transparent pixel locations in the (m/n) pixel maps with m-bit color data, such that the m-bit color value is divided into (m/n) segments and each of the segments is respectively stored in the (m/n) pixel maps at the associated non-transparent pixel locations.

9. The method of claim 1, further comprising reading color codes from the color palette.

10. The method of claim 1, further comprising:
searching the first palette table for a particular m-bit color value and, if not located in the first palette table, searching the additional palette tables for the particular m-bit color value; and
reading the n-bit color code from the first or additional palette tables in which the m-bit color value is located.

11. A method of compressing color data, comprising:
providing an expandable color palette comprising n-bit color codes, each of the n-bit color codes mapping to an m-bit color value, wherein m is an integer greater than n;
providing a pixel map of a graphic drawing space, the pixel map comprising palette values each representing an n-bit color code and a palette table identifier;
searching, in response to an m-bit color value input, the color palette for a particular n-bit color code associated with the input m-bit color value, and writing the particular n-bit color code in the pixel map at each pixel map location in which the m-bit color value appears;
inserting, if the particular m-bit color value does not appear in a palette table of the color palette, the m-bit color value in an available location in the palette table and writing the particular n-bit color code in the pixel map at each pixel map location in which the m-bit color value appears;
generating, if no location is available in the palette table, an additional pixel map and an additional palette table, inserting the m-bit color value in the additional palette table, and writing the particular n-bit color code in the additional pixel map at each additional pixel map location in which the m-bit color value appears; and providing a link for associating the palette table to the additional palette table.

12. The method of claim 11, wherein up to (m/n)−1 palette tables are generated for storing sets of $2^n-1$ n-bit color codes.

13. The method of claim 11, wherein up to a total of (m/n)−1 pixel maps are generated for storing respective sets of $2^n-1$ n-bit color codes.

14. The method of claim 11, wherein n=8 bits, m=32 bits, such that each palette table stores up to 255 8-bit color codes, and the color palette is expandable to up to 3 generated palette tables.

15. The method of claim 11, wherein the pixel maps comprises a pre-established number of palette values including a reserved palette value, the reserved palette value storing a linking value that associates the pixel map with the additional pixel map.

16. The method of claim 11, further comprising reading m-bit color codes from the color palette.

17. The method of claim 11, further comprising:
searching the first palette table for a particular m-bit color code and, if not located in the first palette table, searching the additional palette table for the particular m-bit color code; and
reading the n-bit color code from the first or additional palette table in which the m-bit color code is located.

18. The method of claim 11, further comprising:
providing a usage bitmap representative of the graphic drawing space, the usage bitmap comprising pixel values representative of a transparency state of a corresponding pixel in the graphic drawing space, a non-transparent state for pixel values in the usage bitmap indicating usage of an associated color code in one of the palette tables;
after storing the pre-established number of n-bit color codes in each of (m/n)−1 palette tables, generating an $(m/n^{th})$ pixel map;
looking up a particular m-bit color value associated with non-transparent pixel locations in the usage bitmap; and
replacing palette values at the associated non-transparent pixel locations in the (m/n) pixel maps with m-bit color data, such that the m-bit color value is divided into (m/n) segments and each of the segments is respectively stored in the (m/n) pixel maps at the associated non-transparent pixel locations.

19. A system for compressing color data, comprising:
memory configured to support an expandable color palette for storing a pre-established number of n-bit color codes, each of the n-bit color codes mapping to an m-bit color value, wherein m is an integer greater than n; and
a processor, coupled to the memory, the processor storing up to the pre-established number of n-bit color codes in a first palette table of the color palette, expanding the color palette to include up to a specified number of additional palette tables for storing additional sets of the pre-established number of n-bit color codes, and storing a link value for associating the first palette table to one or more additional palette tables.

20. The system of claim 19, wherein the pre-established number of n-bit color codes is characterized by $2^n-1$ color codes.

21. The system of claim 19, wherein the processor expands the color palette to include up to (m/n)−1 palette tables for storing sets of $2^n-1$ color codes.

22. The system of claim 19, wherein the processor generates up to (m/n) pixel maps and uses up to (m/n)−1 pixel maps to facilitate storing of the n-bit color codes in an associated palette table.

23. The system of claim 19, wherein n=8 bits, m=32 bits, such that each palette table stores up to 255 8-bit color codes, and the color palette is expandable to up to 3 palette tables.

24. The system of claim 19, further wherein the processor:
generates a first pixel map of the graphic drawing space, the first pixel map comprising palette values each representing an n-bit color code and a palette table identifier, the palette table identifier associating the first pixel map with the first palette table; and
generates up to a total of (m/n) pixel maps, each of (m/n)−1 pixel maps being associated with one of the additional palette tables.

25. The system of claim 24, further wherein the processor:
generates a usage bitmap representative of the graphic drawing space, the usage bitmap comprising pixel values representative of a transparency state of a corresponding pixel in the graphic drawing space, a non-transparent state for pixel values in the usage bitmap indicating usage of an associated color code in one of the palette tables;
after storing the pre-established number of n-bit color codes in each of (m/n)−1 palette tables, generates an $(m/n^{th})$ pixel map;
performs a lookup of a particular m-bit color value associated with non-transparent pixel locations in the usage bitmap; and
replaces palette values at the associated non-transparent pixel locations in the (m/n) pixel maps with m-bit color data, such that the m-bit color value is divided into (m/n) segments and each of the segments is respectively stored in the (m/n) pixel maps at the associated non-transparent pixel locations.

26. The system of claim 19, further wherein the processor:
provides a usage bitmap representative of the graphic drawing space, the usage bitmap comprising pixel values representative of a transparency state of a corresponding pixel in the graphic drawing space; and
writes a value indicative of a non-transparent state to pixel values in the usage bitmap having an associated color code in one of the palette tables.

27. The system of claim 19, further wherein the processor reads color codes from the color palette.

28. The system of claim 19, further wherein the processor:
searches the first palette table for a particular m-bit color value and, if not located in the first palette table, searches the additional palette tables for the particular m-bit color value; and
reads the n-bit color code from the first or additional palette tables in which the m-bit color value is located.

29. An information bearing medium comprising processor-readable instructions for compressing color data, the processor-readable instructions causing a processor to perform the steps of:
providing an expandable color palette for storing a pre-established number of n-bit color codes, each of the n-bit color codes mapping to an m-bit color value, wherein m is an integer greater than n;
storing up to the pre-established number of n-bit color codes in a first palette table of the color palette;

expanding the color palette to include up to a specified number of additional palette tables for storing additional sets of the pre-established number of n-bit color codes; and providing a link for associating the first palette table to one or more additional palette tables.

30. The medium of claim 29, wherein the pre-established number of n-bit color codes is characterized by $2^n-1$ color codes.

31. The medium of claim 29, wherein expanding the color palette comprises expanding the color palette to include up to (m/n)−1 palette tables for storing sets of $2^n-1$ color codes.

32. The medium of claim 29, wherein storing the color codes further comprises providing up to (m/n) pixel maps, the method further comprising using up to (m/n)−1 pixel maps to facilitate storing of the n-bit color codes in an associated palette table.

33. The medium of claim 29, wherein n=8 bits, m=32 bits, such that each palette table stores up to 255 8-bit color codes, and the color palette is expandable to up to 3 palette tables.

34. The medium of claim 29, further comprising:

providing a first pixel map of the graphic drawing space, the first pixel map comprising palette values each representing an n-bit color code and a palette table identifier, the palette table identifier associating the first pixel map with the first palette table; and generating up to a total of (m/n) pixel maps, each of (m/n)−1 pixel maps being associated with one of the additional palette tables.

35. The medium of claim 34, further comprising:

providing a usage bitmap representative of the graphic drawing space, the usage bitmap comprising pixel values representative of a transparency state of a corresponding pixel in the graphic drawing space, a non-transparent state for pixel values in the usage bitmap indicating usage of an associated color code in one of the palette tables;

after storing the pre-established number of n-bit color codes in each of (m/n)−1 palette tables, generating an $(m/n^{th})$ pixel map;

looking up a particular m-bit color value associated with non-transparent pixel locations in the usage bitmap; and replacing palette values at the associated non-transparent pixel locations in the (m/n) pixel maps with m-bit color data, such that the m-bit color value is divided into (m/n) segments and each of the segments is respectively stored in the (m/n) pixel maps at the associated non-transparent pixel locations.

36. The medium of claim 29, further comprising:

providing a usage bitmap representative of the graphic drawing space, the usage bitmap comprising pixel values representative of a transparency state of a corresponding pixel in the graphic drawing space; and writing a value indicative of a non-transparent state to pixel values in the usage bitmap having an associated color code in one of the palette tables.

37. The medium of claim 29, further comprising reading color is codes from the color palette.

38. The medium of claim 29, further comprising:

searching the first palette table for a particular m-bit color value and, if not located in the first palette table, searching the additional palette tables for the particular m-bit color value; and reading the n-bit color code from the first or additional palette tables in which the m-bit color value is located.

\* \* \* \* \*

UNITED STATES PATENT AND TRADEMARK OFFICE
CERTIFICATE OF CORRECTION

| | |
|---|---|
| PATENT NO. | : 7,091,985 B1 |
| APPLICATION NO. | : 09/571790 |
| DATED | : August 15, 2006 |
| INVENTOR(S) | : Timothy Leroy Towns and John T. Varga |

Page 1 of 1

It is certified that error appears in the above-identified patent and that said Letters Patent is hereby corrected as shown below:

Col. 9, Line 11: "When" should begin a new paragraph

Col. 10, Line 20:

After the word "used" and before the word "indicated", it should read -- to determine 352 if the pixel is used or is transparent. If the pixel is used, as --

Col. 16, Line 25: Delete the word "is"

Signed and Sealed this

Fifth Day of December, 2006

JON W. DUDAS
*Director of the United States Patent and Trademark Office*